US009430425B1

(12) United States Patent
Czajkowski

(10) Patent No.: US 9,430,425 B1
(45) Date of Patent: Aug. 30, 2016

(54) MULTI-CYCLE RESOURCE SHARING

(71) Applicant: ALTERA CORPORATION, San Jose, CA (US)

(72) Inventor: Tomasz Czajkowski, Toronto (CA)

(73) Assignee: Altera Corporation, San Jose, CA (US)

( * ) Notice: Subject to any disclaimer, the term of this patent is extended or adjusted under 35 U.S.C. 154(b) by 817 days.

(21) Appl. No.: 13/727,807

(22) Filed: Dec. 27, 2012

(51) Int. Cl.
*G06F 13/362* (2006.01)
(52) U.S. Cl.
CPC .................... *G06F 13/362* (2013.01)
(58) Field of Classification Search
CPC ............................ G06F 13/36; G06F 13/1605
See application file for complete search history.

(56) References Cited

U.S. PATENT DOCUMENTS

| | | | | |
|---|---|---|---|---|
| 6,212,542 B1* | 4/2001 | Kahle | ................. | G06F 9/30087 712/204 |
| 8,095,778 B1* | 1/2012 | Golla | ................... | G06F 9/3824 712/214 |
| 2010/0123717 A1* | 5/2010 | Jiao | ....................... | G06T 15/005 345/426 |
| 2010/0274992 A1* | 10/2010 | Chou | ................. | G06F 9/30032 712/216 |

OTHER PUBLICATIONS

"OpenCL—The open standard for parallel programming of heterogeneous systems", Khronos Group.
G. Gill, J. Hansen, and M. Singh, "Loop Pipelining for High-Throughput Streaming Computation Using Self-Timed Rings," in proceedings of the International Conference on Computer-Aided Design, Nov. 2006, San Jose, California, USA, pp. 289-296.
J. Cong, W. Jiang, "Pattern-based behavior synthesis for FPGA resource reduction" Proceedings of the ACM/SIGDA Int. Symp. on FPGAs, Monterey, California, 2008.

\* cited by examiner

*Primary Examiner* — Nimesh G Patel
(74) *Attorney, Agent, or Firm* — Fletcher Yoder, P.C.

(57) ABSTRACT

Systems and methods for resource sharing of pipelined circuitry of an integrated circuit (IC) are provided. For example, in one embodiment, a method for sharing a functional unit of an integrated circuit (IC) includes receiving two or more threads configured to access the functional unit through two or more data entry points associated with corresponding data exit points configured to receive processed thread data. The method further includes arbitrating the processing of the two or more threads by the functional unit to obtain the processed thread data. To arbitrate, the exit points that cannot receive additional data are determined. Threads are only received from data entry points with corresponding data exit points that can receive additional data. The processed output data is provided to a corresponding exit point.

20 Claims, 8 Drawing Sheets

MULTI-CYCLE RESOURCE SHARING

BACKGROUND

The present disclosure relates generally to integrated circuits (ICs). More particularly, the present disclosure relates to efficiently sharing resources of the ICs, such as a field programmable gate array (FPGA), while preventing a pipelined circuit from stalling and experiencing an unnecessary reduction in throughput.

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Integrated circuits (ICs) take a variety of forms. For instance, field programmable gate arrays (FPGAs) are integrated circuits that are intended as relatively general-purpose devices. FPGAs may include logic that may be programmed (e.g., configured) after manufacturing to provide any desired functionality that the FPGA is designed to support. Thus, FPGAs contain programmable logic, or logic blocks, that may be configured to perform a variety of functions on the FPGAs as designed by a designer. Additionally, FPGAs may include input/output (I/O) logic, as well as high-speed communication circuitry. For instance, the high-speed communication circuitry may support various communication protocols and may include high-speed transceiver channels through which the FPGA may transmit serial data to and/or receive serial data from circuitry that is external to the FPGA.

In ICs, such as FPGAs, the programmable logic is typically configured using low level programming languages such as VHDL or Verilog. Unfortunately, these low level programming language may provide a low level of abstraction and, thus, may provide a development bather for programmable logic designers. Higher level programming languages, such as Open CL, have become useful for enabling more ease in programmable logic design. These higher level programming languages are used to generate code corresponding to the low level programming languages.

To reduce an amount of circuit area needed to implement a programmable logic design, resource sharing may be used, enabling functional unit resources of the programmable logic design to be utilized by a multitude of operations. Such resource sharing may be particularly useful when a high-level description of a circuit comprises loops and/or divergent paths of execution between resources that could be shared. Unfortunately, such sharing of resources may result in an unnecessary loss of throughput of the ICs. Indeed, in the case of multi-cycle operations, where it may take several clock cycles before a result of an operation (e.g., a floating point addition calculation) is available. During these clock cycles, the functional units could be used to compute more data, but a pipeline could stall without careful resource binding and arbitration.

Resource sharing of functional units historically has been handled by providing multiplexers at inputs of a functional unit that is to be shared. The multiplexing of incoming data allows several data sources to provide data for operation by a functional unit. The resulting output of the functional unit may be stored in a register for later access. This method of resource sharing has been particularly useful for single-cycle operations where a new result may be computed by the functional unit at each clock cycle. However, such resource sharing has not been effective for multi-cycle operations (e.g., floating point operations). During multi-cycle operations (e.g., floating point operations), it may take several clock cycles before a result of the operation is available. During these cycles, additional data could be fed to the same functional unit for additional computations. However, a pipeline could stall without careful consideration for resource binding and arbitration.

SUMMARY

Certain aspects commensurate in scope with the originally claimed invention are set forth below. It should be understood that these aspects are presented merely to provide the reader with a brief summary of certain forms of the invention might take and that these aspects are not intended to limit the scope of the invention. Indeed, the invention may encompass a variety of aspects that may not be set forth below.

Present embodiments relate to systems, methods, and devices for improving resource sharing of an integrated circuit (IC) (e.g., a field programmable gate array (FPGA)) between parallel-driven tasks (e.g., OpenCL kernels). In particular, the present embodiments may provide simple and effective systems and methods of resource sharing that limits stalling of pipelined hardware regardless of the resource binding within a shared functional unit of the programmable logic design. The embodiments disclosed herein may ensure that a shared resource is efficiently utilized while preventing the IC from stalling.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to efficient sharing of resources needed to implement parallel tasks (e.g. OpenCL kernels) on an integrated circuit (IC) (e.g., a field programmable gate array (FPGA)). Resource sharing may help to reduce the area on the IC that is needed to implement a particular functionality.

Figure 1A:
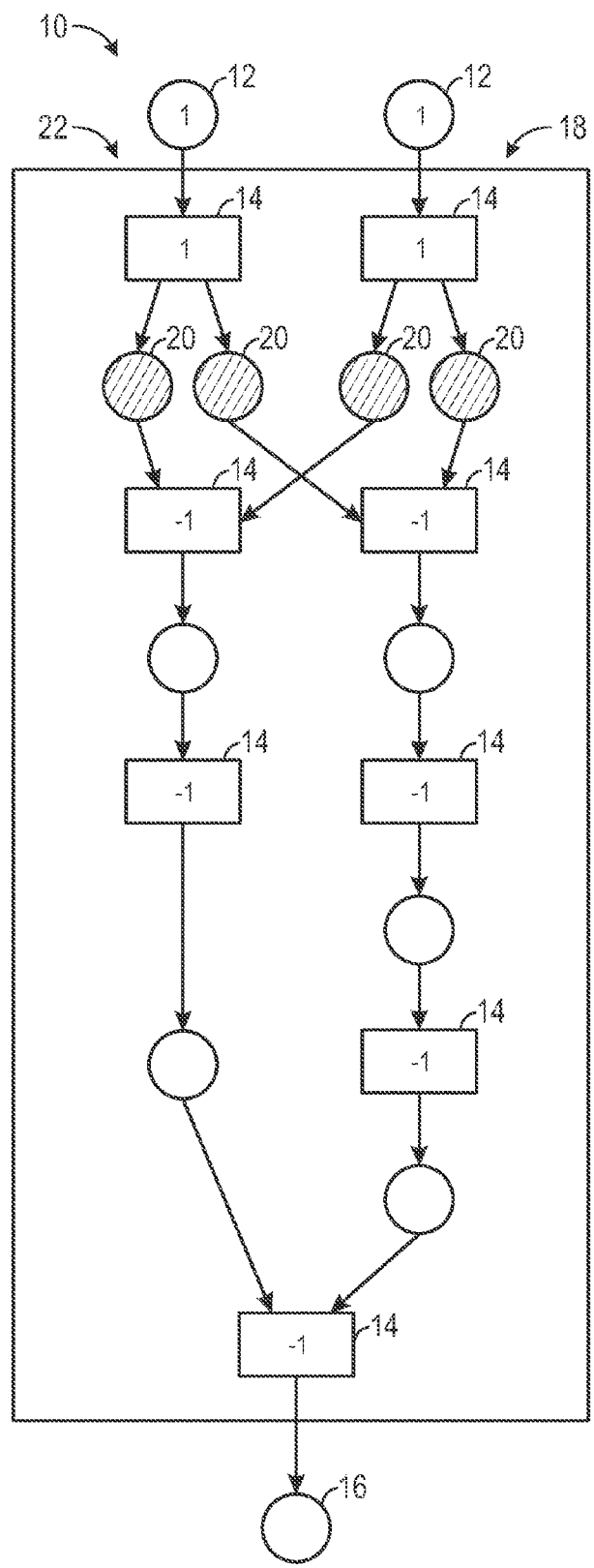
FIGS. 1A-1D illustrate an example of a multi-cycle functional unit that is prone to stalling when resource sharing is applied to the functional unit.

With the foregoing in mind, FIGS. 1A-1D illustrate an example of a multi-cycle functional unit 10 that may be prone to stalling when resource sharing is applied. For example, the functional unit 10 may be a multi-cycle functional unit 10 that may use multiple clock cycles to provide computation results. As illustrated in FIG. 1A, the functional unit 10 may be provided data 12 to perform computational operations 14 on. For example, the functional unit 10 could be a floating point operation such as an addition, subtraction, multiplication, or division function. Each computational operation 14 of the functional unit 10 may take one clock cycle. Thus, in the illustrated embodiment, the functional unit 10 may provide a resultant computation 16 in five clock cycles (as illustrated by the right computational path 18 that includes five computational operations 14 each taking one clock cycle. The shaded circles provided in the illustration of FIGS. 1A-1D represent valid data 20 that has not yet been consumed by a subsequent computational operation 14. For example, during a first clock cycle, a first set of data 12 (labeled with a "1") is provided to the functional unit 10, where a first level of computational operations 14 of the functional unit 12 process the data 12. After a first clock cycle, valid data 20 is output from the first set of computational operations 20, but is not yet processed by the second level of computational operations 14 (accordingly labeled "–1" because they are not currently computing valid data).

Figure 1B:
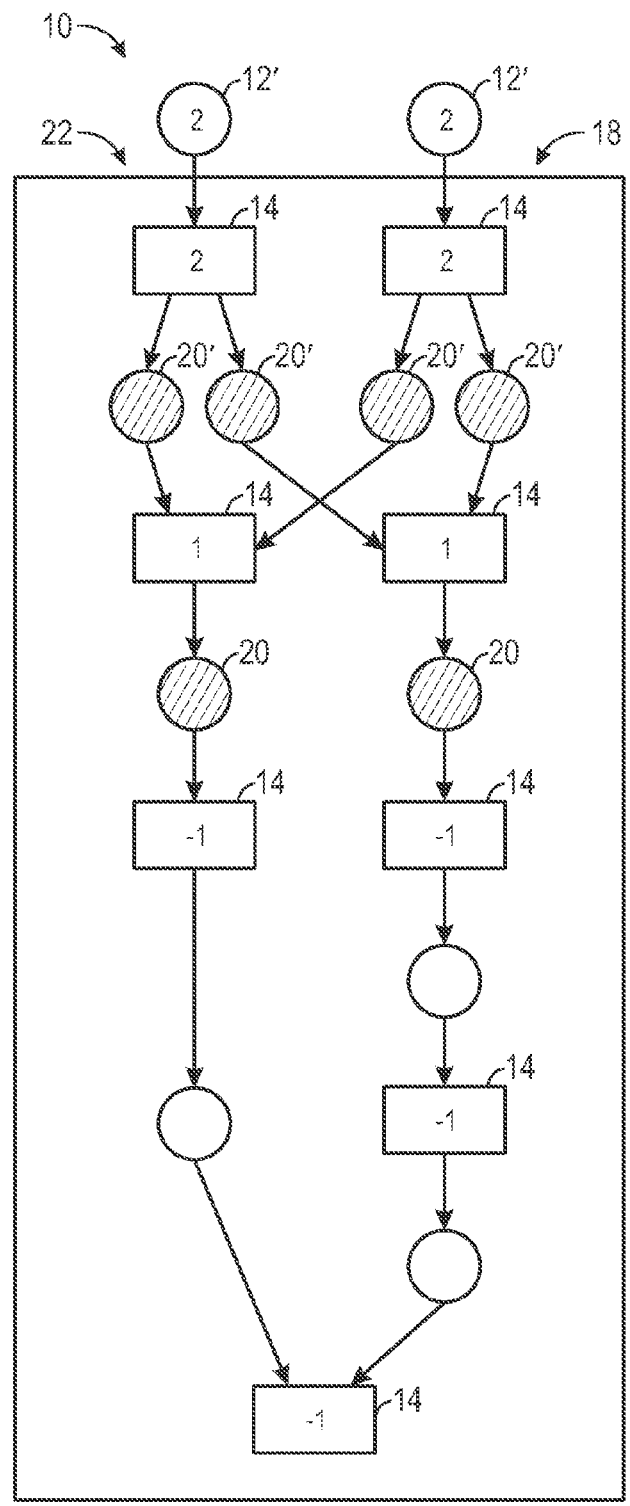

FIG. 1B illustrates the functional unit 10 after a second clock cycle. As illustrated, the first set of data 12 is processed by the second level of computational operations 14 (accordingly labeled "1"). Further, as described above, because resource sharing is enabled for the functional unit, a second set of data 12' (labeled "2") is provided to the functional unit 10 for computation. The second set of data 12' is processed by the first level of computational operations 14 and thus is accordingly illustrated with a label "2" to signify that the second set of data 12' has been processed. Further, the second level of circles is now shaded to illustrate that the valid data 20 has been provided by the second level of computational operations 14, but has not yet been processed by the third level of computation operations 14. At this point, no stall has occurred, because there is no need to wait for processing by subsequent computational operations 14 before completing a current computational operation. However, as will be discussed in more detail below, such a stall may likely occur with resource sharing of the illustrated functional unit 10.

Figure 1C:
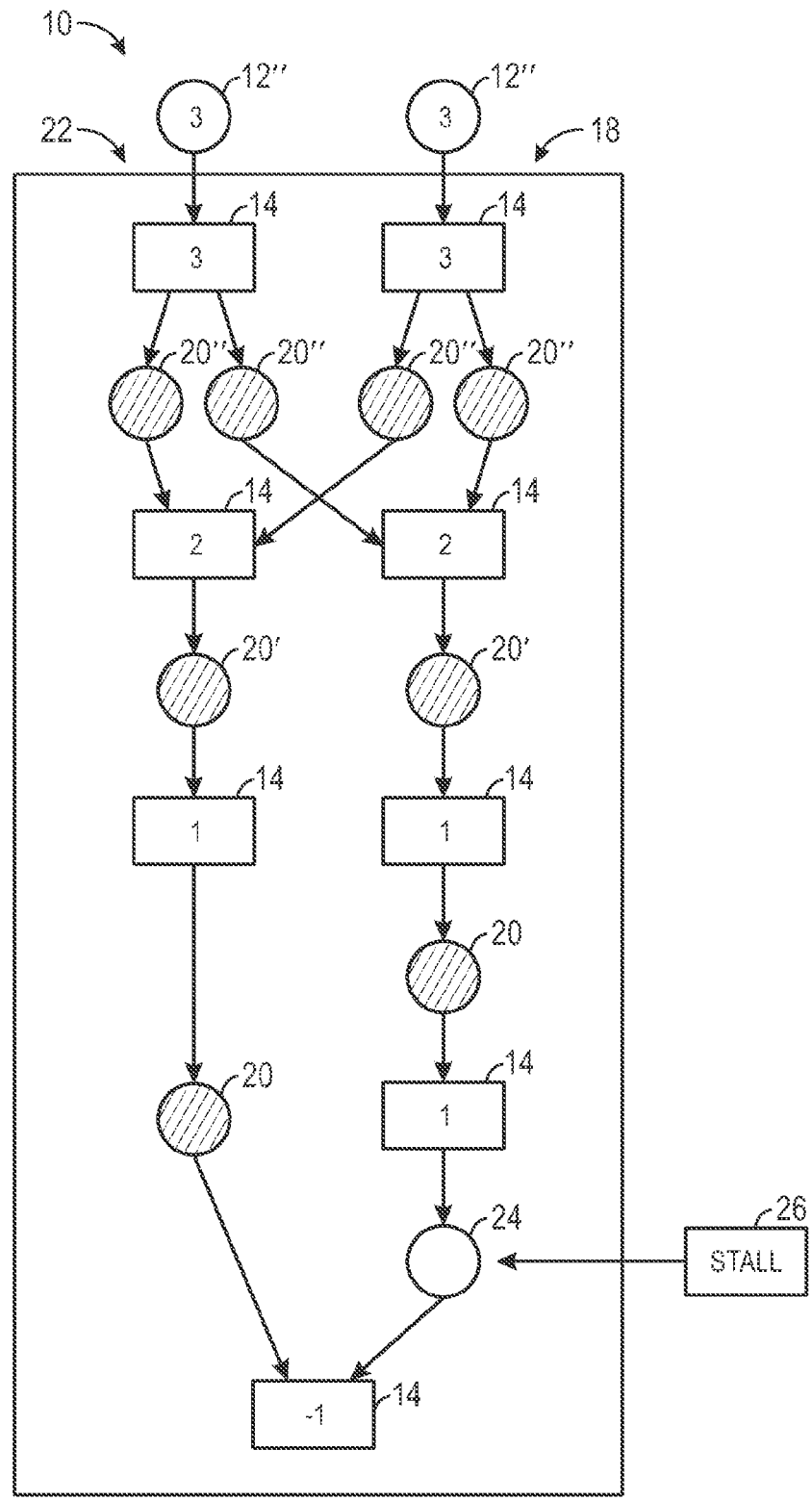

FIG. 1C is an illustration of the functional unit 10 after a third clock cycle has passed. As illustrated in FIG. 1C, a third set of data 12" (labeled "3") may be provided the shared functional unit 10. The third set of data 12" is processed by the first level of computational units 14 (labeled "3" to signify that the third set of data 12" has been processed by the first level of computational operations 14). The first row of shaded circles 14 represents the output from the first level of computational units 14 that has not yet been consumed b the second level of computational units 14. The second level of computational units 14 processes the second set of data 12' (accordingly labeled "2" to signify that the second data set has been computed). Accordingly, the second level of circles represents the output data from the second level of computational operations 14. Further, the third set of computational operations 14 processes the first set of data 12 (accordingly labeled "1") and the resultant circles are shaded to signify that that data is processed but not yet provided to the subsequent computational operations 14. As illustrated in the FIG. 1C, the next set of computational operations 14 are not on similar levels. For example, the right path 18 has an additional computational operation 14 that must be processed before the next computational operation 14 on the right path 22 may be executed. Thus, the last computational operation 14 provided in the illustrated example cannot process the first data set 12 because it is waiting on a computational operation 14 on the right path 18 (as illustrated by the hollow circle 24. Accordingly, the functional unit 10 may stall 26, waiting for valid data 20 to be provided by the fourth level of computational operations 14 of the right path 18.

Figure 1D:
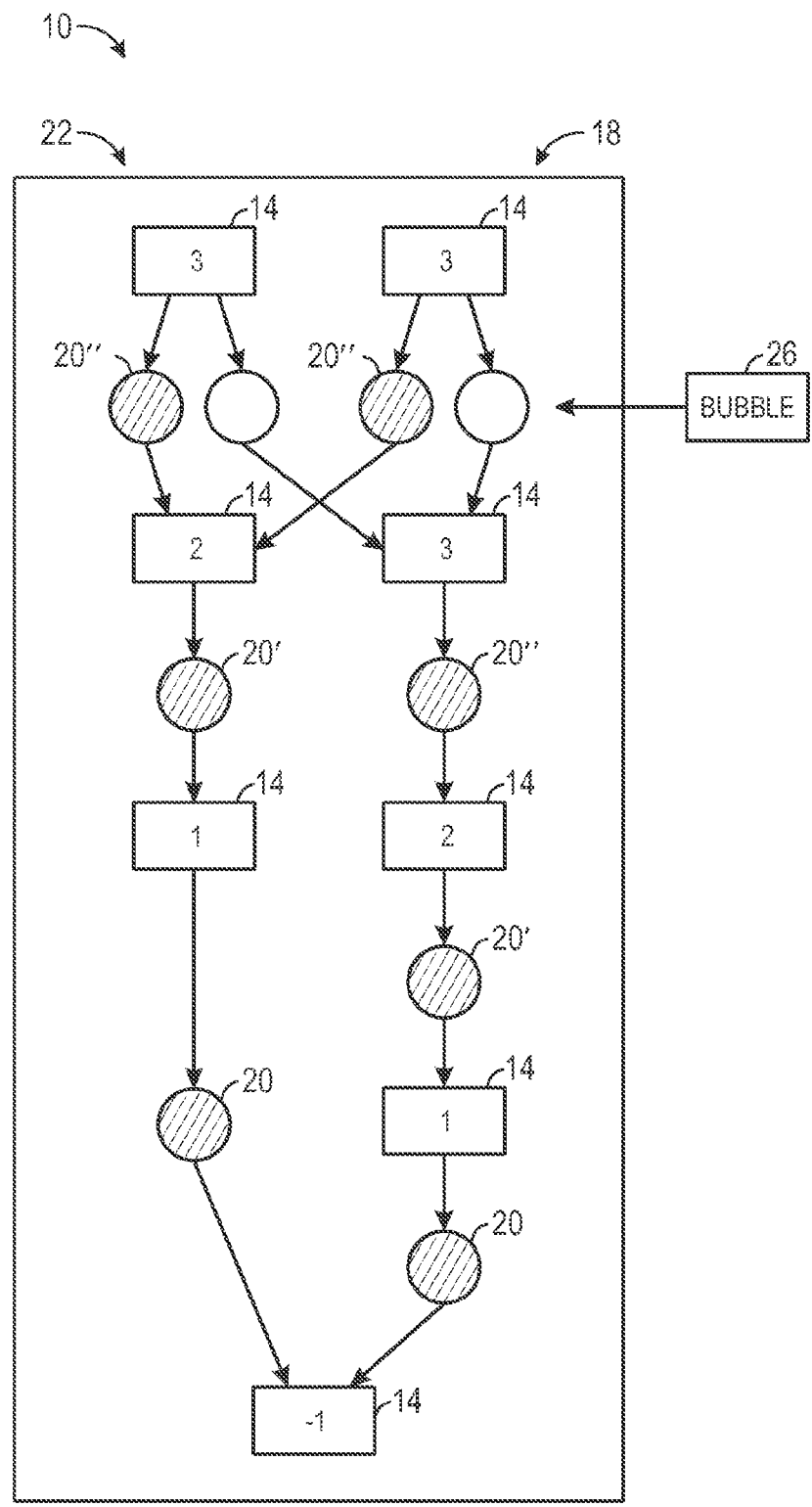

FIG. 1D illustrates the functional unit 10 after the next clock cycle is completed. As illustrated, the last computational operation, labeled "–1" has not processed the data 12, but now the fourth level of computational operations has completed operations on the data 12, and is accordingly labeled "1". Each of the data sets 12, 12', and 12" traverse through the right path 18, but no more data is able to flow through the left path 18, because the throughput has stalled, waiting for data from the right path 18 to reach the last computational operation 14. Accordingly, a bubble 26 forms in the data feed. Over the subsequent clock cycles, the bubble 26 will propagate through the right path 18, eventually causing further stalls 26 within the pipeline.

Figure 2:
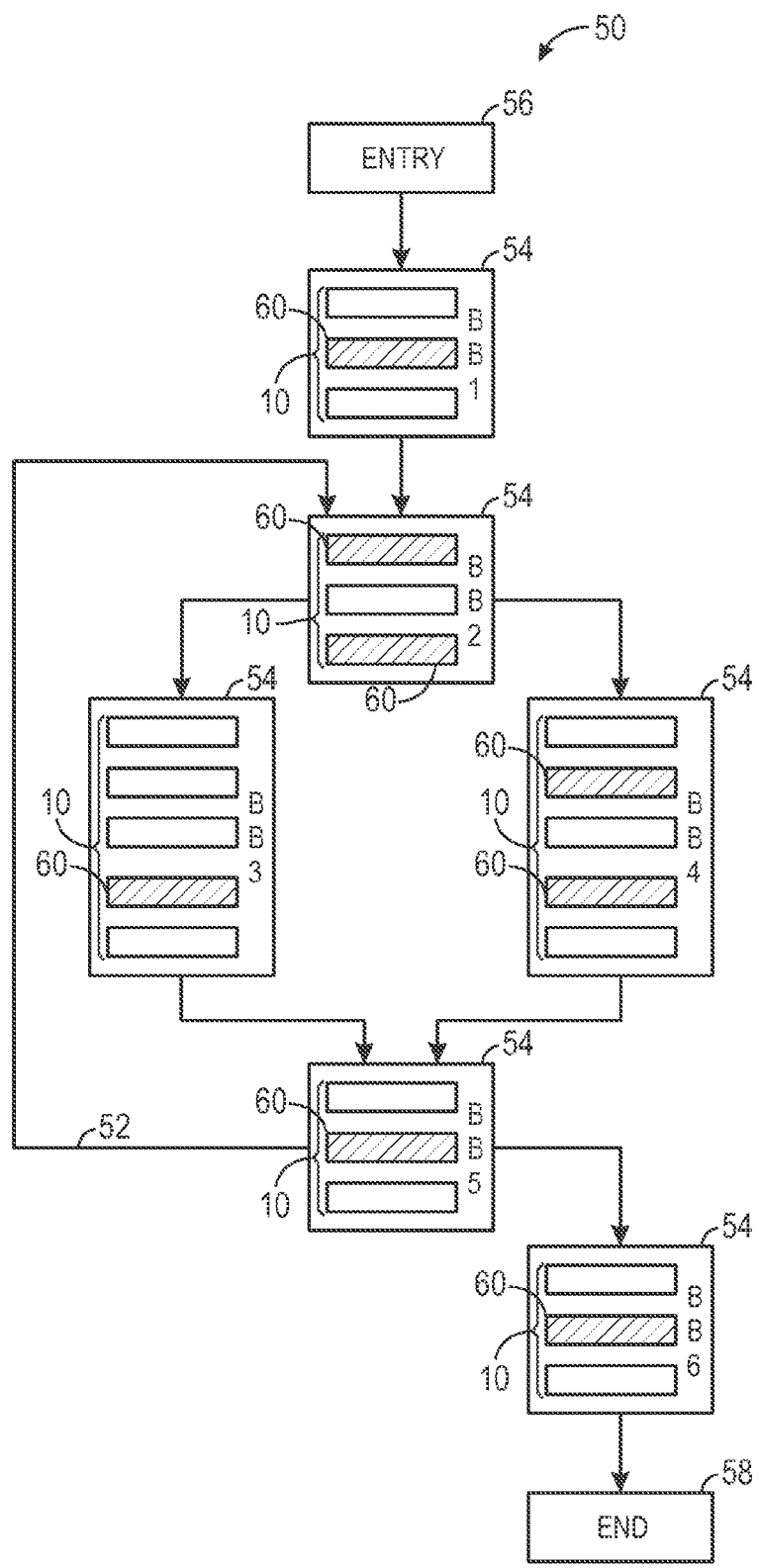
FIG. 2 illustrates an example of a kernel with functional units that may be shared to reduce an implementation area on the IC, in accordance with an embodiment.

Having discussed the benefits and challenges associated with resource sharing, the discussion now turns to determining how to efficiently share resources. For example, programmable logic design software, such as Quartus II by Altera™ may determine how and when to share resources within a kernel 50. Such software may interpret kernel code to generate programmable logic that includes shared functional units. Once the software has generated the appropriate programmable logic, the programmable logic is implemented on the IC (e.g., an FPGA). To aid in this discussion, FIG. 2 is an illustration of a kernel 50 with functional units 10 contained within basic blocks 54, some of which may be candidates for hardware logic sharing (e.g., provide the same functionality, and thus may be shared via one functional unit). The basic blocks 54 may be a programmable logic implementation determined by a conversion of a high-level program into the basic blocks 54 that may process data along divergent paths. For example, basic block 54 BB1 may receive data from the entry point 56 and pass the information to basic block 54 BB2. BB2 may include processing instructions such as a conditional statement that provides divergent paths. For example, BB2 may include a conditional statement such as "if condition is true then BB3 else BB4," which will control the computational flow through the kernel 50, depending on whether the condition is met. In the provided example, the result of the divergent paths (either from BB3 or BB4) is provided to BB5 where additional computations may be performed. The kernel 50 may include feedback loops 57, which may cause the computations to reenter prior basic blocks 54. Eventually, resultant data from BB5 may flow to BB6 where a final set of computations is performed and provided to an exit point 58. In some languages, such as OpenCL, the kernel 50 may be implemented on an IC, such as an FPGA, as a pipelined circuit, where each instruction is scheduled to take several clock cycles, potentially in parallel with unrelated operations. When an application is executed on such a circuit, each thread propagates through the pipeline, and may be followed by additional threads.

As illustrated in FIG. 2, some or all of the basic blocks 54 may include functional units 10 that may be sharing candidates. For example, each of the shaded functional units 10 may be similar functional units 10 (e.g., floating point addition functional units). The design software may determine the sharing candidates by determining functional units that provide similar functionality. For example, in the example depicted in FIG. 2, the shaded functional units 10 may all provide floating point addition. Because each of the shaded functional units 10 implements the same functionality, the design software may determine that each of these functional units 10 may be sharing candidates 60.

Next, the design software may determine the effect of sharing functionality between the sharing candidates 60 may have. For example, in certain situations, such sharing may negatively affect the throughput of the overall system. However, the sharing of functionality may positively affect the programmable logic area utilized by functional unit logic. Thus, the design software may calculate tradeoffs between positive and negative effects to determine an efficient sharing scheme among the sharing candidates 60.

The throughput may be negatively affected when potential stalls may be incorporated into the execution of the kernel 50 by executing a number of threads in the kernel 50 above a maximum number of threads that may exist between the first and last sharing candidates 60 in order to avoid a stall. The maximum number of threads may be determined by calculating the minimum distance between any two sharing candidates 60. For example, in the embodiment of FIG. 2, assuming that the functional units 10 are each one cycle, the sharing candidate 60 (e.g., the shaded functional unit) in basic block 54 BB1 is two cycles away from the first sharing candidate 60 (e.g., the shaded functional unit 10). Thus, the maximum number of threads that may exist between the first and last sharing candidates 60 is two. Any additional thread/thread data that is allowed to exist between the first and last sharing candidates 60 may cause a stall in the kernel because the functional units 10 may not be able to handle the excessive data. Accordingly, to balance or implement a tradeoff between increased throughput and reduced programmable logic area, the design software may determine one or more subsets of the sharing candidates 60 to share. By defining the sharing candidates as subsets, the throughput of the shared hardware implementation may be increased.

Figure 3:
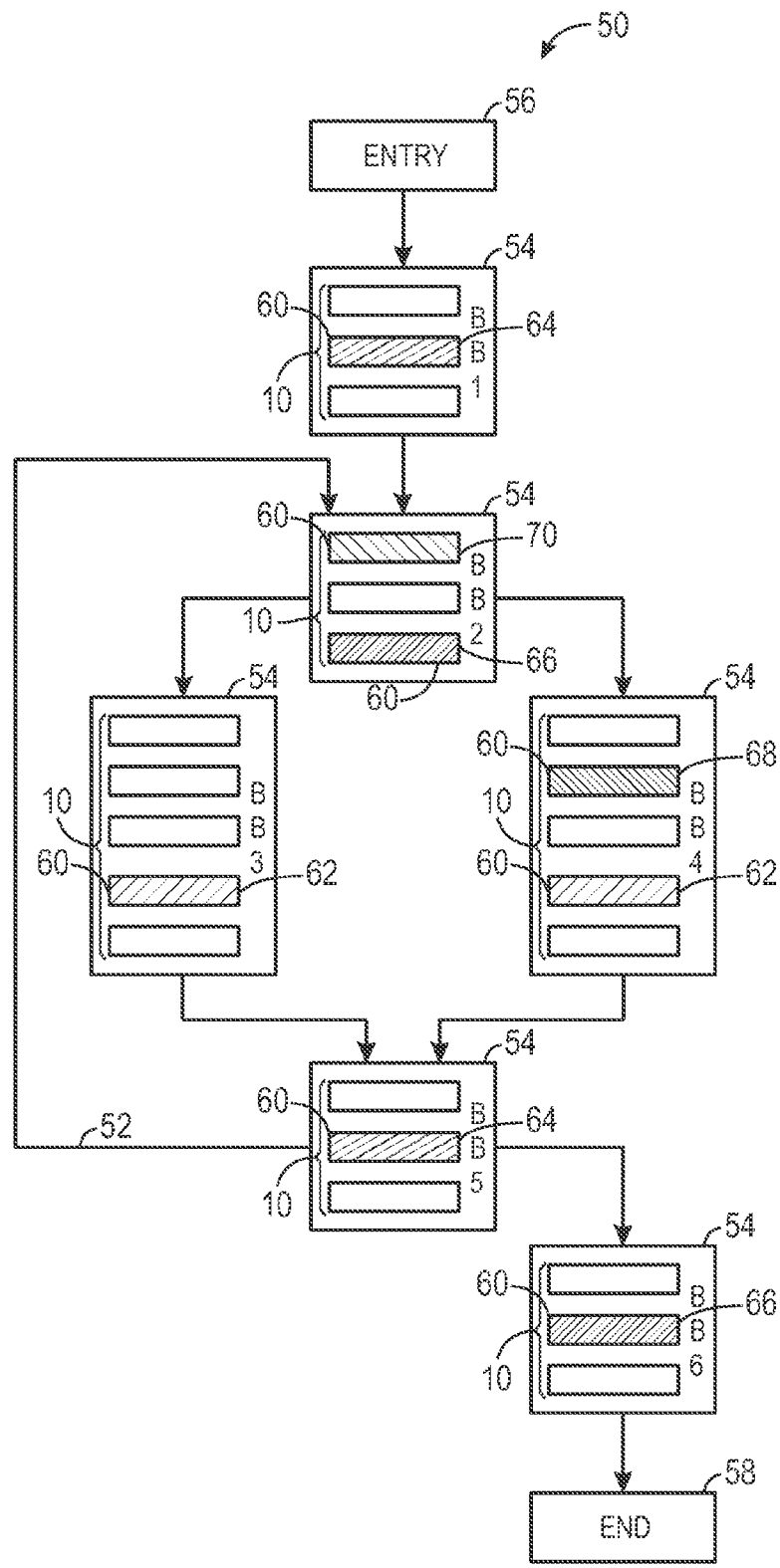
FIG. 3. illustrates the kernel of FIG. 2 with shared functional units, in accordance with an embodiment.

For example, FIG. 3 illustrates the kernel 50 of FIG. 2 where the design software has determined subsets 62, 64, 66, 68, and 70 of functional unit sharing candidates 60 to increase throughput. The design software may determine the subsets based upon many factors. For example, in one embodiment, the design software may determine a subset 62 of sharing candidates based upon an "exclusive or" (XOR) or a mutually exclusive relationship between sharing candidates. In other words, when one of set of sharing candidates will be invoked and one or more of the other sharing candidates in the set will not be invoked, the sharing candidates may be shared because only one of the functional units within the set will be invoked. For example, when an if-then-else clause is implemented, only one of two basic blocks will be implemented. In the kernel 50 of FIG. 3, for example, basic blocks BB3 and BB4 may represent basic blocks that are part of an if-then-else clause. For example, as discussed above, the clause might state if condition is true then BB3 else BB4. In any case, these functional units 10 may be a sharing candidate subset (e.g. subset 62) because, depending on whether the condition is met, either basic block BB3 or basic block BB4 and not both will be implemented.

Additionally or alternatively, in certain embodiments, the design software may determine subsets (e.g., subsets 64, 66, 68, and 70) based upon spacing of the sharing candidates 60. For example, in the provided embodiment of FIG. 3, the design software may desire the number of maximum live threads between the first and last shared candidates 60 to be at least ten. This number of maximum live threads may be determined based upon limitations of the hardware implementation. For example, as will be discussed in more detail below, the functional unit 10 making up subset 70 may be called every ten clock cycles without any sharing being done on this functional unit 10. Thus, the maximum number of live threads, will be at most ten. As discussed above, the maximum number of live threads may depend on the minimum distance between two shared functional units 10. Thus, the design software may define the shared subsets (e.g., subsets 64, 66, 68, and 70) such that no two shared functional units 10 are within a distance of 11 cycles. For example, the functional units 10 that make up subset 64 are 11 cycles apart. Further, the functional units 10 that make up the subset 66 are spaced a distance of ten cycles. The functional unit 10 making up subset 68 is within a distance of ten cycles for all of the other functional units 10 and thus is the only functional unit 10 in the subset 68. Further, the functional unit 10 making up the subset 70 may be called every ten cycles if the loop back 57 is used to re-instantiate the functional unit 10 of subset 70. There are no other functional units 10 within ten cycles that are not assigned a subset, and thus this functional unit 10 is the only one in subset 70.

As may be appreciated, by increasing the number of cycles between the shared functional units 10, additional threads may be incorporated into the kernel 50. Thus, throughput may be greatly increased. For example, as depicted in FIG. 2, when two functional units 10 are not spaced according the subset scheme described above, the maximum number of live threads that may be introduced into the kernel 50 is 2. However, by increasing the distance between shared functional units 10, as depicted in FIG. 3, the number of live threads may be increased to ten, thus significantly increasing throughput while still reducing the area required to implement the programmable logic design on the IC (e.g., an FPGA).

Figure 4:
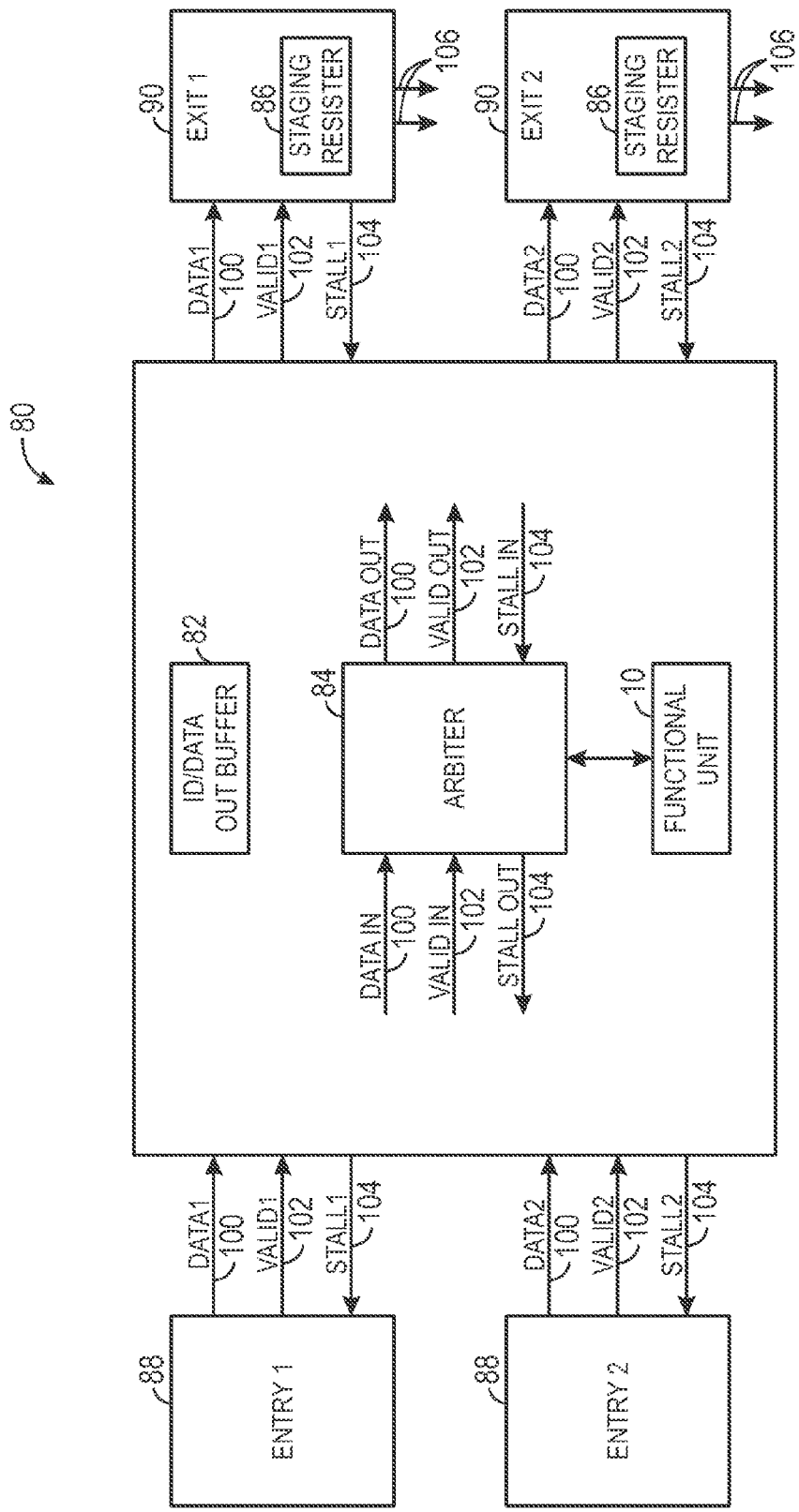
FIG. 4 illustrates a logic structure enabled to allow functional unit sharing while limiting stalls that may occur based upon the sharing of the functional unit, in accordance with an embodiment.
Figure 5:
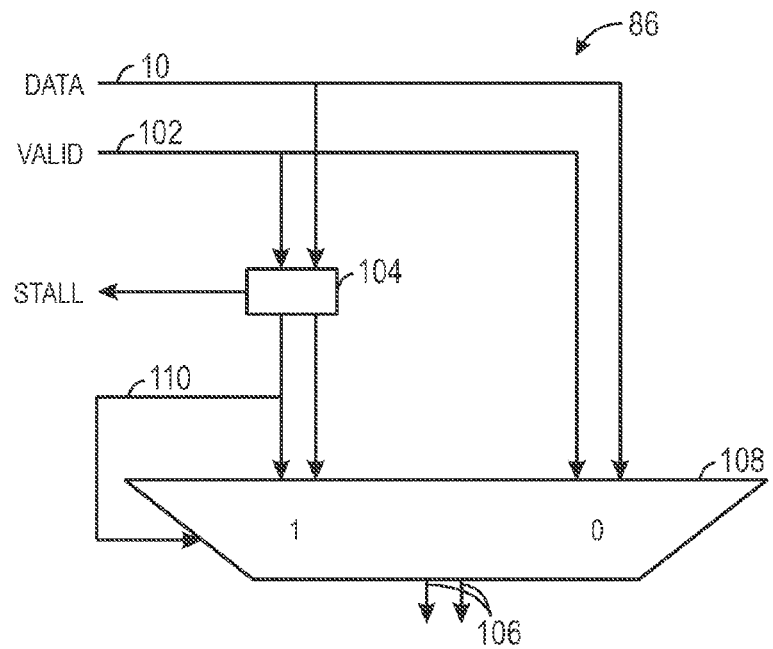
FIG. 5 illustrates a staging register of the logic structure of FIG. 4, in accordance with an embodiment.

To implement the functional unit sharing techniques discussed above, logic structures may work together with the functional units 10 to prevent a pipelined circuit from stalling and experiencing unnecessary reduction in throughput. FIG. 4 illustrates a schematic diagram of a hardware block 80 useful for preventing pipeline stalls while enabling functional unit 10 sharing. FIG. 5 illustrates a schematic diagram of a staging register, in accordance with an embodiment. For clarity, FIGS. 4 and 5 will be discussed together. As illustrated in FIG. 4, the hardware block 80 may include three primary components. Namely, the hardware block 80 may include an ID/Data buffer 82, an arbiter 84, and staging registers 86.

To process data, entry points 88 provide a data signal 100 providing data to be operated on and a valid signal 102 to the hardware block 80. The valid signal indicates if the given data is valid and should be processed. As will be discussed in more detail below with regards to the staging registers 86, the entry points may receive a stall signal 104 from the hardware block 80. When a stall signal 104 is received by the data entry point 88, the data entry point 88 halts production of data signals 100 to the hardware block 80.

When no stall signal 104 is received by the data entry point 88, the data signals 100 and valid signal 102 are received by the hardware block 80. The signals are provided to the arbiter 84, which accepts the data signals 100 and valid signals 102. The data signals 100 are provided to the functional unit 10, which processes the data signals 100. The arbiter 84 then provides the processed data signal 100 to a corresponding data exit point 90. Processed data signals 100 may be continually provided to the data exit point 90 until downstream logic produces a stall signal indicating that it is unable to process more data at this time. When this happens, the exit point 90 stores the received data signal 100 in a staging register 86 located at the exit point 90. The staging register 86 may assert the stall signal 104 to the arbiter 84, which may cause the arbiter 84 to quit processing data for the exit point 90 asserting the stall signal 104 and instead process data signals 100 for another entry point 88 and exit point 90.

To ensure that a pipelined circuit does not stall due to the use of the hardware block 80, the arbiter 84 selects between available outputs based on the state of the corresponding exit point 90. The arbiter 84 does not accept valid data signals 100 for an entry point 88 with a corresponding exit point 90 that is producing a stall signal 104. Instead, the arbiter 84 will assert a stall signal to the entry point 88 and process other entry points 88 with associated exit points 90 that are not stalled.

The ID/Data buffer 82 may store results contained within the pipeline in case of a stall in any operation that follows the current operation (e.g., downstream). The ID/Data buffer 82 may include a shift register that stores an identifier of an entry point 88 used to access the functional unit 10. The shift register may also store a global identifier that identifies the operation and any output data relating to the operation. The depth of the ID/Data buffer 82 relative to the pipeline length of the shared functional unit 10 may directly impact system performance. For example, in certain embodiments, the ID/Data buffer 82 may be configured to be large enough to store enough data for the maximum number of live threads executed in the hardware block 80. Thus, the hardware block 80 will not be dependent on storing any of this data in off-chip memory, which may hinder performance (e.g., by increasing data access and storage times). In certain embodiments, to ensure that the functional unit 10 pipeline may be cleared without losing data during the sharing process, the ID/Data buffer 82 may be sized according to the number of entry points 88 or the number exit points 90 and the number of pipeline stages. In particular, in these embodiments, the size of the ID/Data buffer 82 may be at least the number of entry points 88/exit points 90 multiplied by the number of pipeline stages.

As discussed above, the staging registers 86, located at each of data exit points 90 enable the arbiter 84 of the hardware block 80 to switch from processing one operation to the next by switching the data entry points 88 and/or data exit points 90. For example, the staging registers 86 located at each data exit point 90 may enable data from the ID/Data buffer 82 to exit the hardware block 80, freeing up space in the pipeline for additional data. In some embodiments, staging registers 86 may be located at each of the data entry points 88. These staging registers 86 may be useful to store data when a temporary stall is encountered downstream in the pipeline. As will be discussed in more detail below, the staging registers 86 may be located at the data exit points 90 and may receive in a data signal 100 and a valid signal 102. The data signal 100 may include the resultant data computed by the functional unit 10 during the execution of operations that flow through the hardware block 80. The valid signal 102 may represent whether the data signal 100 received by the staging register 86 is valid data or ghost data (e.g., invalid data that is transmitted but is not a result of a valid operation of a functional unit 10). From time to time, during the execution of operations in the IC, the data exit points 90 may no longer be able to consume additional data (e.g., because downstream processing is not able to consume more data from the outputs 106). The staging registers 86 may store data when downstream components cannot accept additional data and may further provide a stall signal indicating that no further data should be provided to the data exit points 90 associated with the staging registers 86.

FIG. 5 illustrates an embodiment of such a staging register 86 that may be implemented at the data exit points 90. As illustrated, the staging register 86 may receive as inputs a data signal 100 and a valid signal 102. The valid signal 10 may determine whether the data signal 100 is stored and/or provided to downstream processes. For example, when the data signal 100 is not valid, the data signal 100 may be ignored. However, when the data signal 100 is valid, the data signal 100 may be stored in the register 104 and provided to downstream processing through the outputs 106. When data is stored in the register 104 and no further data may be accepted by the staging register 86, the staging register 86 asserts a stall signal to the hardware block 80. Providing the data signal 100 to downstream processing via the outputs 106 may be controlled by a multiplexer 108. The valid signal 102 may provide a selection bit 110 that determines whether to output data from the register 104 or the currently provided data and valid signals 100 and 102.

By incorporating the hardware block 80 into an IC design, the throughput of shared resources of the IC may be efficiently managed, enabling increased throughput and efficiency. Further, the hardware block 80 may ensure that a permanent stall does not occur in pipelined circuitry.

Figure 6:
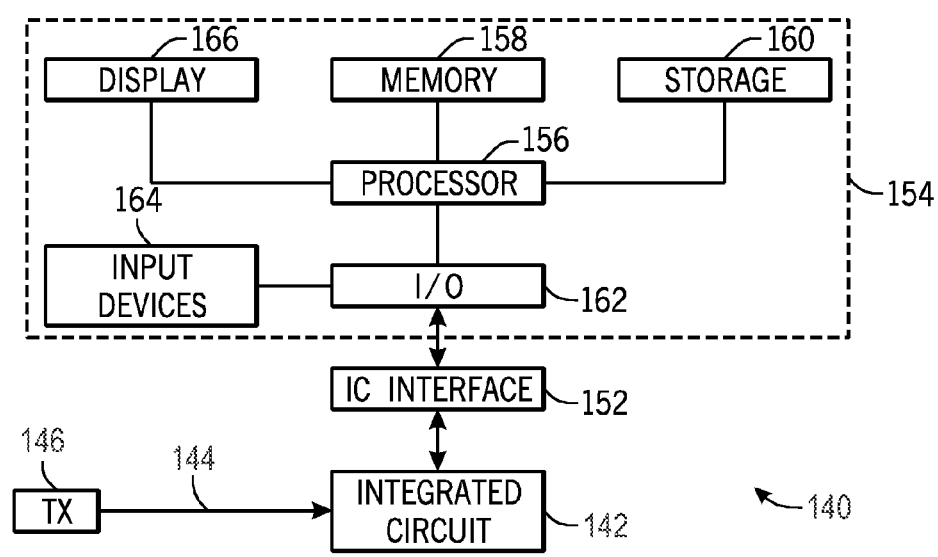
FIG. 6 is a system that enables a programmable logic designer to implement functional unit sharing.

FIG. 6 illustrates a system 140 that enables a programmable logic designer to implement functional unit sharing, such as by incorporating the functional unit sharing logic structure of FIG. 4 in programmable logic of the IC. As illustrated in FIG. 6, the system 140 includes the integrated circuit (IC) 142, which receive the receiver (RX) input signal 144 from the transmitter (TX) 146. An IC interface 152 may enable communication between the IC 142 and a data processing system 154. Such an IC interface 152 may include, for example, programmable logic device (PLD) logic within field programmable gate array (FPGA) circuitry. The IC interface 152 may operate in conjunction with FPGA software, such as Quartus® by Altera Corporation, which may enable programming of intellectual property (IP) into the IC 142. Additionally or alternatively, the data may be sent out via normal FPGA I/O pins of the IC 142. The receiving party may include, for example, the data processing system 154. Such data processing system 154 or test equipment may generally process and construct an eye diagram in software or hardware using the techniques described below.

The data processing system 154 may include, among other things, a processor 156 coupled to memory 158, a storage device 160, input/output (I/O) resources 162 (which may communicably couple the processor 156 to various input devices 164), and a display 166. The memory 158 and/or storage 160 may store one or more algorithms for determining sharing candidates among a set of functional units of the IC design, based on an analysis of the programmable logic design, a user interaction via the IC interface 152, or both. The data processing system 154 may use these algorithms to construct shared functional units within the IC design by incorporating functional unit sharing logic, such as the logic block of FIG. 4. The data processing system 154 may provide associated feedback and/or prompts for display on the display 166.

In some embodiments, while observing the feedback and/or prompts on the display 166, a designer or field engineer may adjust certain features of the functional unit sharing, such as manually defining shared functional units, defining subsets of shared functional units, defining a number of cycles between shared functional units, etc.

As previously discussed, the techniques discussed herein may be useful to efficiently implement a programmable logic design. By determining subsets of functional units to share, the tradeoffs between the throughput of the programmable logic design and the area of an IC needed to implement the programmable logic design may be controlled. Further, by utilizing arbitration logic to detect downstream stalls and arbitrate processing of data based upon the detected downstream stalls, shared functional unit pipeline stalls may be minimized.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method for sharing a functional unit of an integrated circuit (IC), the method comprising:
   receiving two or more threads configured to access the functional unit through two or more data entry points associated with corresponding data exit points configured to receive processed thread data;
   arbitrating the processing of the two or more threads by the functional unit to obtain the processed thread data; and
   providing the processed output data to a corresponding exit point;
   wherein arbitrating the processing comprises:
   determining data exit points that cannot receive additional data, and
   receiving threads only from data entry points with corresponding data exit points that can receive additional data.

2. The method of claim 1, wherein receiving two or more threads comprises receiving two or more data signals and two or more validity signals, wherein the data signals comprise data to be operated on by the functional unit and the validity signals represent whether the data signals are valid data to be operated on.

3. The method of claim 2, wherein arbitrating the processing comprises:
   providing the threads to the functional unit only when the validity signals indicate that the data signals are valid data to be operated on.

4. The method of claim 1, wherein determining the data exit points that cannot receive additional data comprises receiving a stall signal from a downstream component through at least one of the data exit points.

5. The method of claim 1, comprising providing a stall signal to the data entry points with corresponding data exit points to notify the data entry points to stop sending data.

6. The method of claim 1, comprising storing provided processed thread data in a staging register of the data exit point when components downstream from the data exit point cannot process additional data.

7. The method of claim 1, comprising storing the processed thread data in a data buffer when a data exit point corresponding to the processed thread data cannot accept the processed thread data to enable the arbitration of additional threads.

8. An integrated circuit (IC) device, comprising:
   a functional unit on the IC device configured to process data; and
   arbitration logic configured to arbitrate sharing of the functional unit between two or more threads of execution and temporarily stall reception of new threads of execution when a corresponding data exit point cannot accept additional data.

9. The integrated circuit device of claim 8, wherein the arbitration logic comprises:
   the functional unit, configured to consume and process the threads of execution;
   an arbiter configured to arbitrate access of the two or more threads of execution to the functional unit; and
   a data buffer configured to store data that temporarily cannot be consumed downstream from the arbitration logic.

10. The integrated circuit device of claim 9, wherein the arbiter is configured to accept valid data from an entry point only if an exit point corresponding to the entry point is able to accept additional data.

11. The integrated circuit device of claim 9, wherein the data buffer is sized to equal at least the product of a number of data entry points or data exit points of the arbitration logic and a number of pipeline stages of the functional unit.

12. The integrated circuit device of claim 9, wherein the functional unit is clocked at a higher clock rate to increase throughput and the data buffer is sized to store additional data from the functional unit when the functional unit is clocked at the higher clock rate.

13. The integrated circuit device of claim 8, comprising:
   two or more data entry points communicatively coupled to the arbitration logic, wherein the data entry points are configured to:

provide data signals corresponding to the threads of execution to the arbitration logic, the data signals comprising data to be operated on by the functional unit, and provide validity signals corresponding to the threads of execution to the arbitration logic, wherein the validity signal is configured to notify the arbitration logic whether the corresponding data signal is valid data to be operated on; and two or more data exit points corresponding to the two or more data entry points, communicatively coupled to the arbitration logic, wherein the data exit points are configured to:

receive data processed by the functional unit and provide a stall signal when components downstream from the exit point cannot accept additional data.

14. The integrated circuit device of claim 13, wherein the arbitration logic is configured to provide a stall signal to a data entry point corresponding to a data exit point that provides a stall signal, representing that the data exit point should temporarily suspend providing additional data signals.

15. The integrated circuit device of claim 13, comprising a staging register at each exit point, the staging register configured to store the data processed by the functional unit for the corresponding exit point when the exit point cannot process additional data.

16. The integrated circuit device of claim 15, wherein the staging register is configured to:

determine whether the received data is valid by analyzing a validity bit; and when downstream components cannot process additional data and the received data is valid, store the received data in a register and assert a stall signal to the arbitration logic.

17. A tangible, non-transitory, computer-readable medium, comprising instructions to:

provide a design interface for an integrated circuit (IC), the design interface being configured to enable a designer to implement an IC design of the IC;

determine sharing candidates among a set of functional units of the IC design;

incorporate at least one hardware block in the IC block configured to arbitrate sharing of the sharing candidates between two or more threads of execution to produces resultant data processed by the sharing candidates and temporarily stall reception of new threads of execution when a downstream component cannot accept the resultant data.

18. The tangible, non-transitory, computer-readable medium of claim 17, comprising instructions to:

determine the sharing candidates by determining functional units that provide similar functionality.

19. The tangible, non-transitory, computer-readable medium of claim 17, comprising instructions to:

determine a subset of sharing candidates based at least upon a mutually exclusive relationship between the sharing candidates, cycle spacing between the sharing candidates, or both.

20. The tangible, non-transitory, computer-readable medium of claim 17, comprising instructions to:

determine a minimum cycle spacing between sharing candidates to increase throughput of the IC design based upon a number of cycles between a sharing candidate calling itself in a loop;

determine at least one subset of sharing candidates based at least upon the minimum spacing between the sharing candidates; and implement sharing between the subset of sharing candidates rather than all of the sharing candidates.

* * * * *